(12) United States Patent
Lee et al.

(10) Patent No.: US 11,909,708 B2
(45) Date of Patent: Feb. 20, 2024

(54) PROTECTION SWITCHING DEVICE WITH LINK SELECTIVE SWITCHING BETWEEN HOST DEVICES FOR MAINTENANCE OF COMMUNICATION CONNECTION

(71) Applicant: Marvell Asia Pte Ltd, Singapore (SG)

(72) Inventors: Whay Sing Lee, Milpitas, CA (US); Arash Farhoodfar, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/941,109

(22) Filed: Sep. 9, 2022

(65) Prior Publication Data

US 2023/0055799 A1    Feb. 23, 2023

Related U.S. Application Data

(63) Continuation of application No. 16/878,412, filed on May 19, 2020, now Pat. No. 11,470,038.

(51) Int. Cl.
*H04L 1/22* (2006.01)
*H04L 61/10* (2022.01)
*H04L 1/00* (2006.01)
*H04L 101/622* (2022.01)

(52) U.S. Cl.
CPC .............. *H04L 61/10* (2013.01); *H04L 1/004* (2013.01); *H04L 2101/622* (2022.05)

(58) Field of Classification Search
CPC combination set(s) only.
See application file for complete search history.

(56) References Cited

U.S. PATENT DOCUMENTS

| | | | |
|---|---|---|---|
| 7,345,991 B1 | 3/2008 | Shabtay et al. |
| 7,467,191 B1 | 12/2008 | Wang et al. |
| 7,675,848 B2 | 3/2010 | Vasseur et al. |
| 7,796,594 B2 | 9/2010 | Melman et al. |
| 8,089,963 B2 | 1/2012 | Melman et al. |
| 8,213,296 B2 | 7/2012 | Shannon et al. |
| 8,229,705 B1 | 7/2012 | Mizrahi et al. |
| 8,625,594 B2 | 1/2014 | Safrai et al. |
| 8,660,120 B2 | 2/2014 | Melman et al. |
| 8,804,733 B1 | 8/2014 | Safrai et al. |
| 8,830,841 B1 | 9/2014 | Mizrahi et al. |
| 9,042,405 B1 | 5/2015 | Safrai |
| 10,009,214 B1 | 6/2018 | Farhoodfar et al. |
| 10,511,473 B2 | 12/2019 | Melman |
| 2006/0251074 A1 | 11/2006 | Solomon |
| 2008/0112323 A1 | 5/2008 | Agmon et al. |
| 2008/0253295 A1 | 10/2008 | Yumoto et al. |

(Continued)

FOREIGN PATENT DOCUMENTS

| | | |
|---|---|---|
| CN | 101056257 A | 10/2007 |
| CN | 101719918 A | 6/2010 |

(Continued)

*Primary Examiner* — Phong La

(57) ABSTRACT

The present invention is directed to data communication systems and techniques thereof. In a specific embodiment, the present invention provides a network connector that includes an interface for connecting to a host. The interface includes a circuit for utilizing two data paths for the host. The circuit is configured to transform the host address to different addresses based on the data path being used. There are other embodiments as well.

20 Claims, 7 Drawing Sheets

(56) References Cited

U.S. PATENT DOCUMENTS

| | | |
|---|---|---|
| 2010/0290469 A1 | 11/2010 | Assarpour |
| 2012/0033541 A1 | 2/2012 | Jacob Da Silva et al. |
| 2012/0113835 A1 | 5/2012 | Alon et al. |
| 2013/0039169 A1 | 2/2013 | Schlansker et al. |
| 2013/0329547 A1 | 12/2013 | Takase et al. |
| 2014/0011212 A1 | 1/2014 | Frei et al. |
| 2014/0099097 A1 | 4/2014 | Zheng |
| 2014/0112122 A1 | 4/2014 | Kapadia et al. |
| 2015/0012481 A1 | 1/2015 | Guisado |
| 2015/0017218 A1 | 1/2015 | Pettigrew et al. |
| 2015/0124817 A1 | 5/2015 | Merchant et al. |
| 2015/0172184 A1* | 6/2015 | DeSanti ............... H04L 49/25 370/392 |
| 2017/0015557 A1 | 1/2017 | Daniello |
| 2017/0155573 A1 | 6/2017 | Khemani et al. |
| 2017/0163598 A1 | 6/2017 | Shen et al. |
| 2018/0015751 A1 | 1/2018 | Profaca et al. |
| 2018/0025972 A1 | 1/2018 | Kim |
| 2018/0030968 A1 | 2/2018 | Verma et al. |
| 2018/0034704 A1* | 2/2018 | Kakkar ............... H04L 45/22 |
| 2018/0157515 A1 | 6/2018 | Malloy et al. |
| 2018/0259722 A1 | 9/2018 | Raza et al. |
| 2018/0309685 A1 | 10/2018 | Srinivasan et al. |
| 2019/0002058 A1 | 1/2019 | Merchant et al. |
| 2019/0020580 A1 | 1/2019 | Boutros et al. |
| 2020/0003663 A1 | 1/2020 | Wyatt et al. |
| 2020/0006805 A1 | 1/2020 | Yushin et al. |
| 2020/0013716 A1 | 1/2020 | Uchida |
| 2020/0027893 A1 | 1/2020 | Yang et al. |
| 2020/0036632 A1* | 1/2020 | Kommula ............ H04L 12/462 |
| 2020/0068050 A1 | 2/2020 | Foo |
| 2020/0137161 A1 | 4/2020 | Chintada |
| 2020/0278935 A1 | 9/2020 | Borikar et al. |
| 2021/0011224 A1 | 1/2021 | Chen et al. |
| 2021/0021870 A1 | 1/2021 | Tsukuba |
| 2021/0218706 A1 | 7/2021 | Mulka et al. |
| 2021/0303526 A1 | 9/2021 | Yuan et al. |

FOREIGN PATENT DOCUMENTS

| | | |
|---|---|---|
| CN | 101888331 A | 11/2010 |
| CN | 102215124 A | 10/2011 |
| CN | 103098424 A | 5/2013 |
| WO | WO-2013148303 A1 | 10/2013 |

* cited by examiner

PROTECTION SWITCHING DEVICE WITH LINK SELECTIVE SWITCHING BETWEEN HOST DEVICES FOR MAINTENANCE OF COMMUNICATION CONNECTION

CROSS-REFERENCE TO RELATED APPLICATIONS

The present disclosure is a continuation of U.S. patent application Ser. No. 16/878,412 filed on May 19, 2020. The entire disclosure of the application referenced above is incorporated herein by reference.

BACKGROUND

The present invention is directed to data communication systems and techniques thereof.

Over the last few decades, the use of communication networks has exploded. In the early days of the Internet, popular applications were limited to emails, bulletin board, and mostly informational and text-based web page surfing, and the amount of data transferred was relatively small. Today, the Internet and mobile applications demand a huge amount of bandwidth for transferring photo, video, music, and other multimedia files. For example, a social network like Facebook processes than terabytes of data daily. With such high demands on data storage and data transfer, existing data communication systems need to be improved to address these needs.

For high-speed data communication applications, it is important to ensure system and link reliability. Over the past, various conventional techniques have been proposed and implemented, but unfortunately they have been inadequate. It is thus desirable to have new and improved systems and methods.

SUMMARY

The present invention is directed to data communication systems and techniques thereof. In a specific embodiment, the present invention provides a network connector that includes an interface for connecting to a host. The interface includes a circuit for utilizing two data paths for the host. The circuit is configured to transform the host address to different addresses based on the data path being used. There are other embodiments as well.

According to an embodiment, the present invention provides a network connector device, which includes a first connector coupled to a first switch. The device also includes a second connector coupled to a second switch. The device further includes a third connector coupled to a host. The third connector includes a communication chip. The host is associated with a host address. The communication chip includes a first data path section for connecting the first switch and the host. The communication chip also includes a second data path section for connecting the second switch to the host. The communication chip additionally includes a logic unit configured to assigning the host a first address associated with the first data path section and a second address associated with the second data path section.

According to another embodiment, the present invention provides a communication system. The system includes a first network switch. The system also includes a second network switch. The system additionally includes a host that is associated with a host address. The system also includes a connector connecting the host to the first network switch and the second network switch. The connector comprises a communication chip for interfacing with the host. The communication chip comprises a logic unit for modifying the host address. A first data path is formed between the first network switch and the host. A second data path is formed between the second network switch and the host. The logic unit is configured to transform the host address with a first address for data going to the first network switch. The logic unit is further configured to transform the host address with a second address for data going to the second network switch.

According to yet another embodiment, the present invention provides a network connector device. The device includes a first connector coupled to a first switch. The device also includes a second connector coupled to a second switch. The device further includes a third connector coupled to a host, which is associated with a host address. The third connector includes a first chip for connecting the first switch and the host through a first data path. The third connector also includes a chip for connecting the second switch to the host through a second data path. The third connector additionally includes a control module for connecting the first chip and the second chip.

It is to be appreciated that embodiments of the present invention provide many advantages over conventional techniques. Among other things, by integrating various components needed for redundant data paths in a network connector device, host devices without such redundancies can be allowed to work with different data paths through the connector device, which transform the host address as needed. Devices and methods of the present invention allows for high reliable fault tolerant network systems.

Embodiments of the present invention can be implemented in conjunction with existing systems and processes. For example, the network connectors according to embodiments of the present invention comply with existing communication standards and form factors, and can thus be implemented for a wide range of applications.

The present invention achieves these benefits and others in the context of known technology. However, a further understanding of the nature and advantages of the present invention may be realized by reference to the latter portions of the specification and attached drawings.

BRIEF DESCRIPTION OF DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DESCRIPTION

Figure 1:
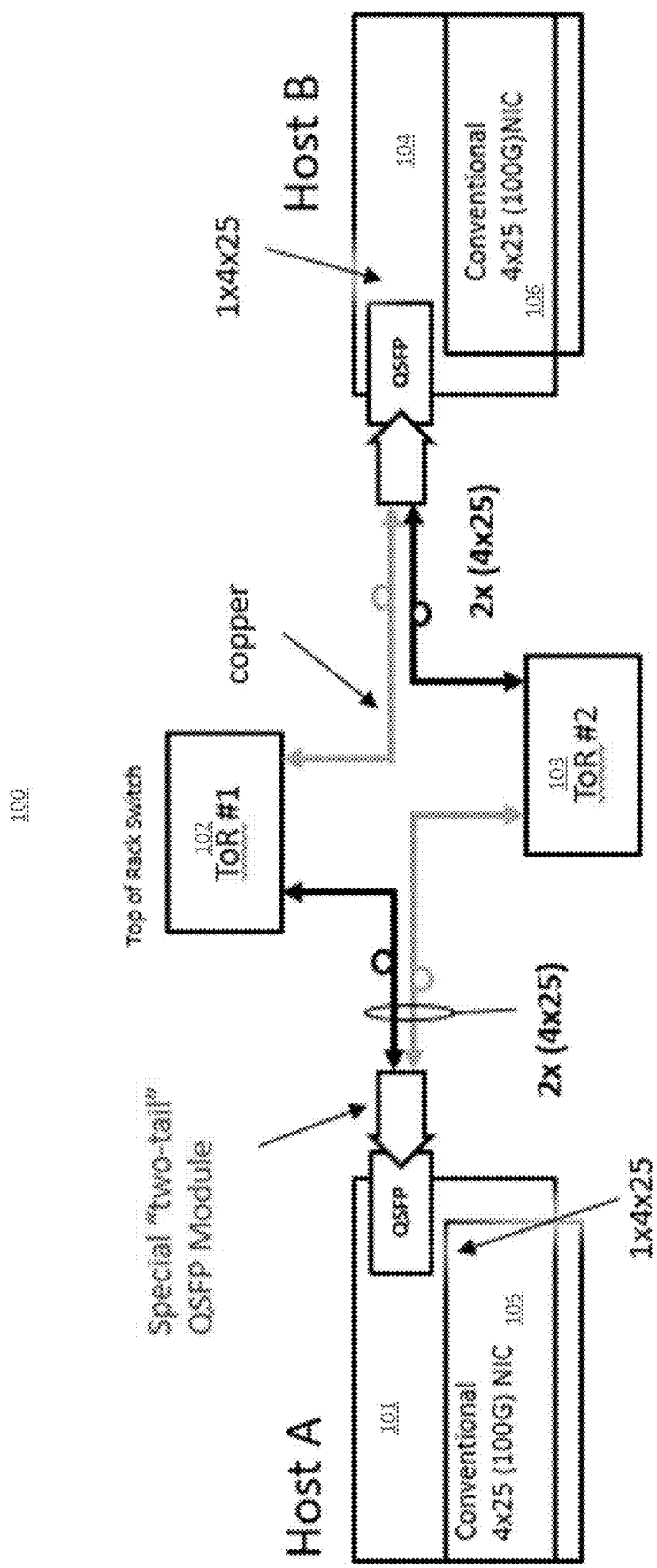
FIG. 1 is a simplified diagram illustrating illustration a communication system 100 according to embodiments of the present invention.

The present invention is directed to data communication systems and techniques thereof. In a specific embodiment, the present invention provides a network connector that includes an interface for connecting to a host. The interface includes a circuit for utilizing two data paths for the host. The circuit is configured to transform the host address to different addresses based on the data path being used. There are other embodiments as well.

An important aspect of communication network is to maintain system reliability. One of the techniques is to provide redundant communication devices; when an in-use communication path is encountering network problems or failures, the communication system would switch from the problem communication path to an alternative communication path. There a few criteria to evaluate a redundant communication system. A first criterium is the seamlessness of the switching process; another is amount of redundant hardware required. It is to be appreciated that embodiments of the present invention provide both substantially seamless switching process and relatively small amount of redundant hardware. For example, a streamlined "dovetail" module—described in further details below—is configured with its host device to allows for efficient switching of a communication path. Among other features, a dovetail module according to embodiments of the present invention efficiently provided multiple redundant components that a conventional host may lack. For example, data path switching is described in U.S. Pat. No. 10,009,214, issued Jun. 26, 2018, which is commonly owned and incorporated by reference herein in its entirety.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram illustrating illustration a communication system 100 according to embodiments of the present invention. This diagram is merely an example, which should not unduly limit the scope of the claims. One of ordinary skill in the art would recognize many variations, alternatives, and modifications. Communication system 100 is implemented as a ring configuration. Host 101 and host 104 are connected to each other via top of rack (ToR) switches 102 and 103. For example, a network connector (with Y-split configuration) is provide to connect host 101 to ToR 12 and ToR 103: a QSFP connector interface is connected to host 101, and two network connector interfaces are connected to ToR 102 and ToR 103.

Communication system 100 is configured to operate in a normal operation mode and a degraded operation mode. In the normal operation mode, there is bi-directional traffic between Host A 101 and ToR switch 102, and there is also bi-directional traffic between Host B 104 and ToR switch 103. Additionally, ToR switch 102 sends IDLE signals to Host B 104, and ToR switch 103 sends IDLE signals to Host A 101. As shown in FIG. 1, Host A 101 includes a quad small form-factor pluggable (QSFP) port for connecting to ToR switch 102, which allows for high bandwidth communication; similarly, Host B 104 includes QSFP port for high bandwidth connection to ToR switch 103. Each of the host includes its own network interface card (NIC). For example, traffic from the NICs can be routed by dove tail modules described below. Degraded operation mode activates when there is a link failure. For example, when ToR switch 102 fails, host 101 and host 104 remain in service, and ToR switch 103 services traffic from both NIC 105 and NIC 106.

During the mode switch process, hardware and software at the physical layer may be configured to couple the host with one of ToR switches on the line side. If the currently-coupled ToR switch (or the path to this ToR) fails or the path to the ToR is severed, the host may reconfigure the hardware/software at the physical layer, such that the host is now re-coupled with another ToR switch (the "spare"), thereby allowing it to resume normal operation. In various implementations, the mechanism does not take into consideration of upper layer protocol-level implications. As a result, while the host may bring up the link again (to a spare ToR switch) after the failure event, the connection is non-negligibly disrupted; a variety of upper-layer protocol handshakes may need to be re-performed before normal traffic can resume.

For various high-speed communication applications, there are various design parameters for the switch-over process (e.g., from normal operation mode to degraded mode, and vice versa). In operation, physical layer of the communication modules does not make switch-over decisions, and they follow upper layer commend.

Figure 2A:
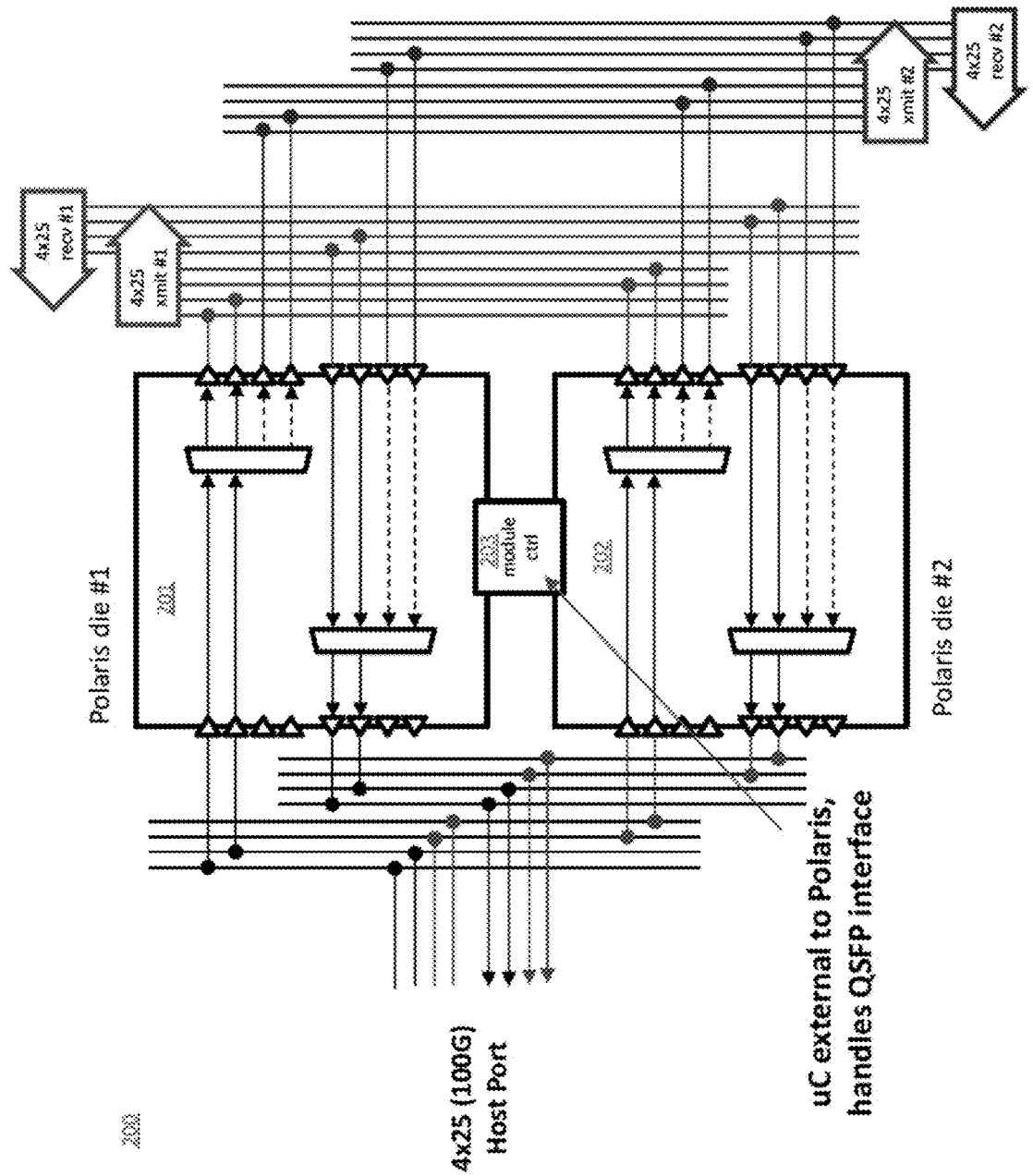
FIG. 2A is a simplified block diagram illustrating a communication device 200 according to embodiments of the present invention.

FIG. 2A is a simplified block diagram illustrating a communication device 200 according to embodiments of the present invention. This diagram is merely an example, which should not unduly limit the scope of the claims. One of ordinary skill in the art would recognize many variations, alternatives, and modifications. As shown in FIG. 2A, communication module 201 is coupled to communication module 202 via a microcontroller 203 that handles QSFP interface. Both communication modules include multiple network ports for connections, and support different communication modes, such as 4×25 (100G) mode. The redundancy of these module connections as shown in FIG. 2A allows for switching to different modes in case of link problems. For example, communication module 201 and communication 202 are used for different data paths, and they each contain independently operable components for independent data path operations.

Figure 2B:
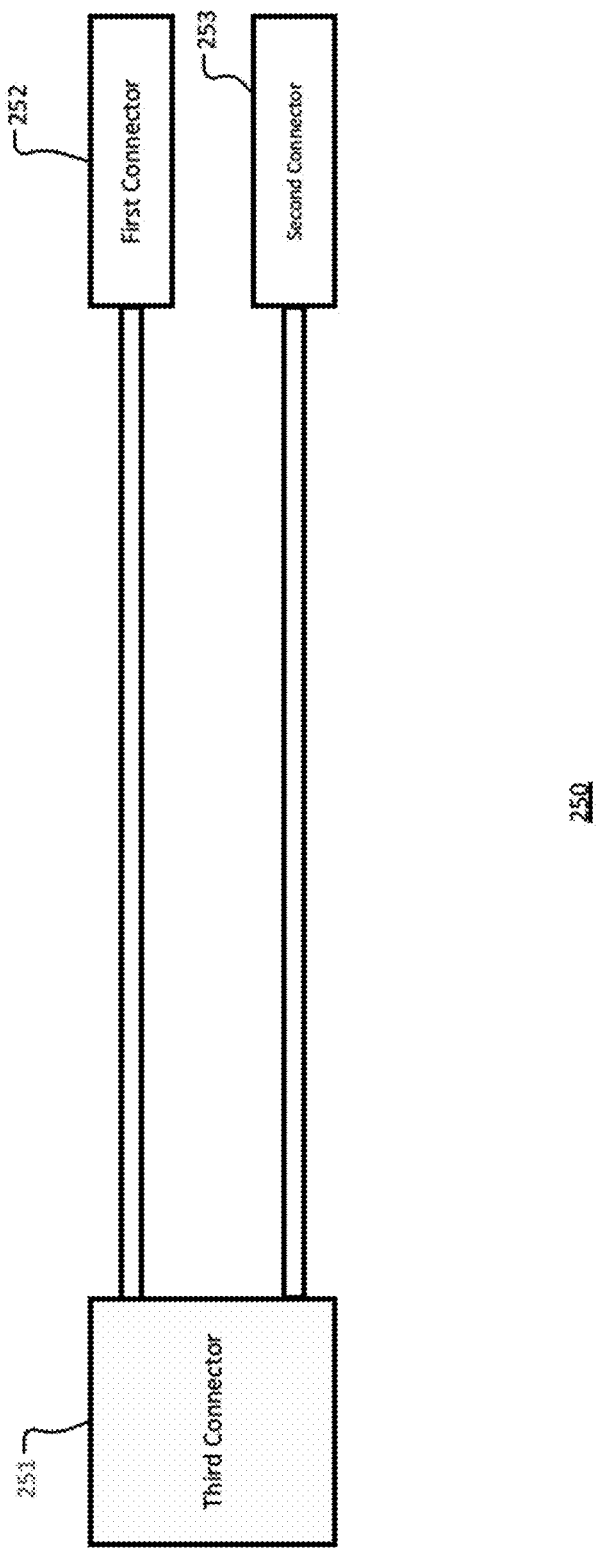
FIG. 2B is a simplified diagram illustrating network connector 250 with built in a built-in communication circuit according to embodiments of the present invention.

FIG. 2B is a simplified diagram illustrating network connector 250 with built in a built-in communication circuit according to embodiments of the present invention. This diagram is merely an example, which should not unduly limit the scope of the claims. One of ordinary skill in the art would recognize many variations, alternatives, and modifications. In various embodiments, network connector 250 has a form factor resembling a network cable. Connector 251 is configured to connect to a host device and it conforms to the form factor of QSFP interface. Connectors 252 and 253 are configured to connect to network switches (e.g., ToR switches). For example, connector 251 is connected to connectors 252 and 253 via data cables. Connector 251 includes a communication circuit (e.g., communication device 200) that is capable for transforming MAC IDs for the host device, thereby allowing the host device to switch to a different communication path to overcome link failures. For example, the connector 251 includes a dovetail module that is described below.

Figure 3A:
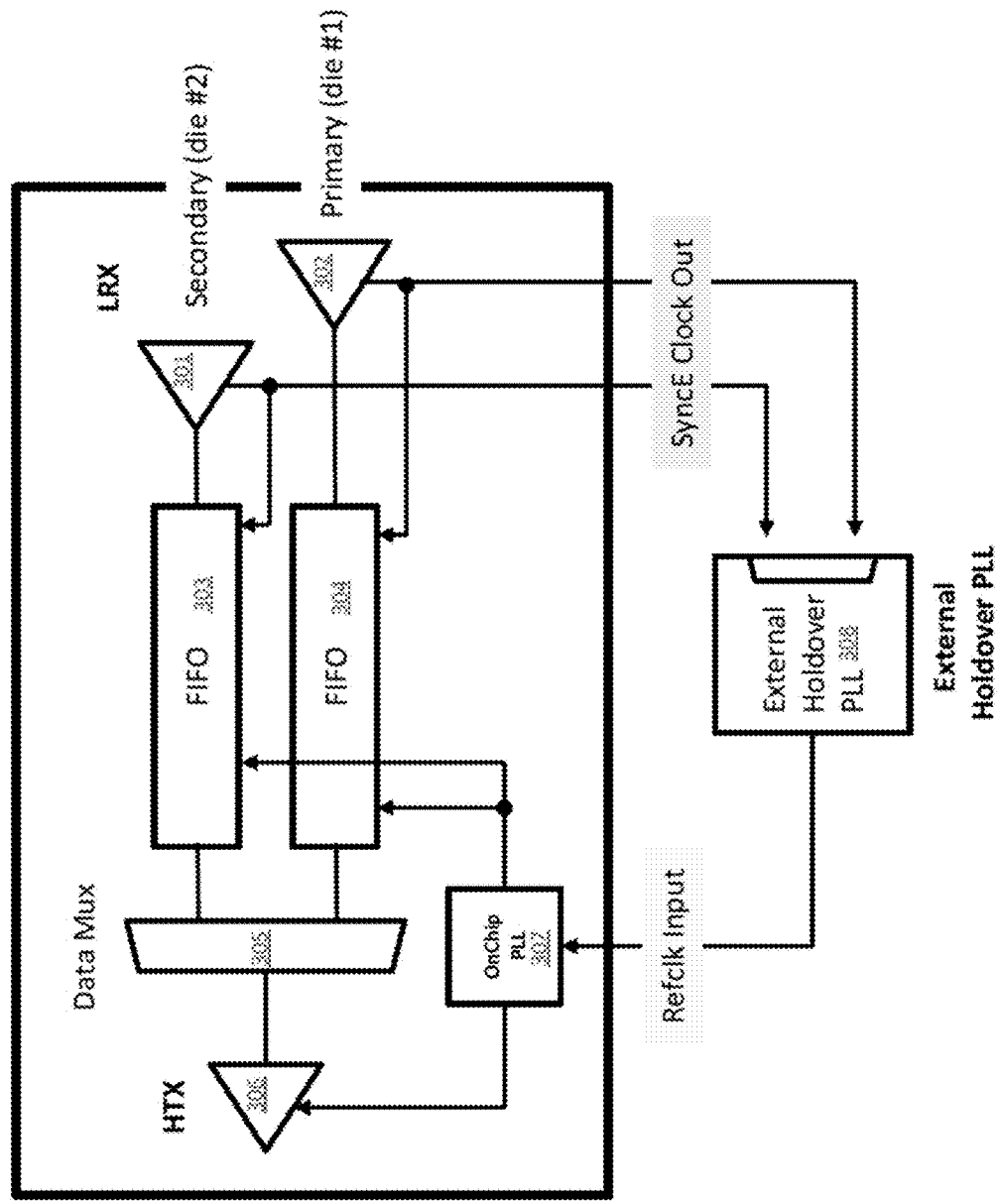
FIG. 3A is a simplified block diagram illustrating a communication platform 300 with an external PLL according to embodiments of the present invention.

FIG. 3A is a simplified block diagram illustrating a communication platform 300 with an external PLL according to embodiments of the present invention. This diagram is merely an example, which should not unduly limit the scope of the claims. One of ordinary skill in the art would recognize many variations, alternatives, and modifications. Communication platform 300 includes a primary communication device 302 and a secondary communication device 301, and each is associated with its respective communication path. FIFOs 303 and 304 provide buffers for data communication. For example, separate data paths may be associated with different clock signals, and upon a failover event, PLL 308 tracks the correct clock signal that is to be used for the operating data path. PLL 308 provide clock signal generation based on data streams from communication devices 301 and 302. For example, communication path associated with communication device 301 includes buffer FIFO 303 and a signal path to external PLL 308; communication path associated with communication device 302 includes buffer FIFO 304 and a signal path to external PLL 308. The external PLL 308 ensures that the HTX output frequency is matched to the frequency of the communication path that is in used (e.g., for data stream coming from a ToR). In various embodiments, communication devices 200 in FIG. 2 are used to implemented blocks 301 and 302. The two communication paths provide redundancy, and when one of the communication paths fails, communication is switched to the other communication path. Data MUX 305 selects between the two data streams, and the selected data stream is provided to HTX connector 306.

Figure 3B:
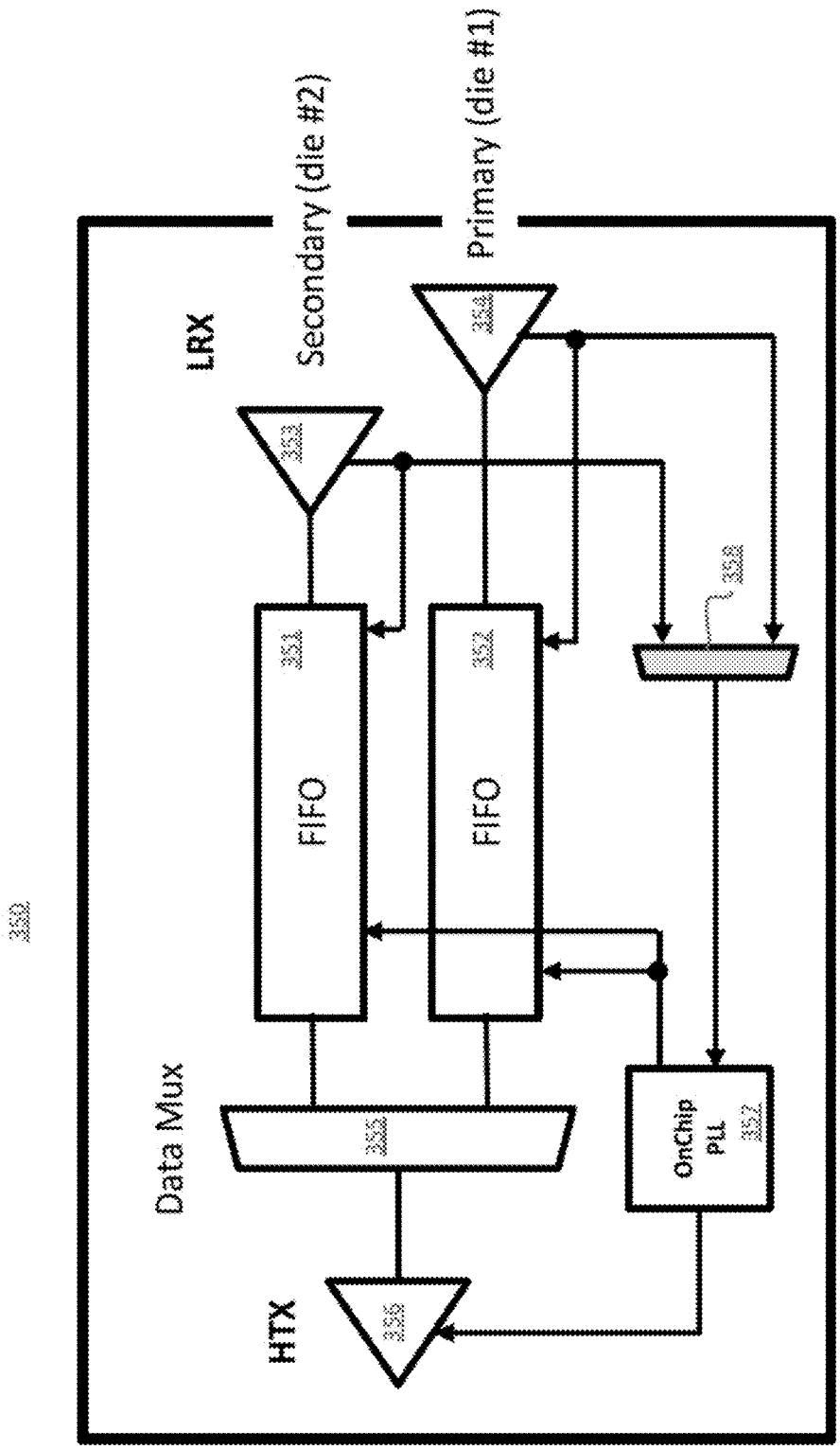
FIG. 3B is a simplified block diagram illustrating a communication platform 350 with a clock crossbar according to embodiments of the present invention.

FIG. 3B is a simplified block diagram illustrating a communication platform 350 with a clock crossbar according to embodiments of the present invention. This diagram is merely an example, which should not unduly limit the scope of the claims. One of ordinary skill in the art would recognize many variations, alternatives, and modifications. Communication platform 350 selects between data two communication paths: a first path with communication device 354 and FIFO 352, a second path with communication device 353 and FIFO 351. The two communication paths provide redundancy: when the first data path fails, the data communication switches to the second data path, and vice versa. In FIG. 3B, instead of using an external PLL (as used in FIG. 3A) for clock signal, an on-chip PLL 357 is used and receives the data stream selected by MUX 358. The clock selection mechanism provided by mux 358 is used to ensure that the HTX output frequency is matched to the frequency of the communication path that is in used (e.g., for data stream coming from a ToR). Data MUX 355 selects between the two data streams, and the selected data stream is provided to HTX connector 356.

Figure 4:
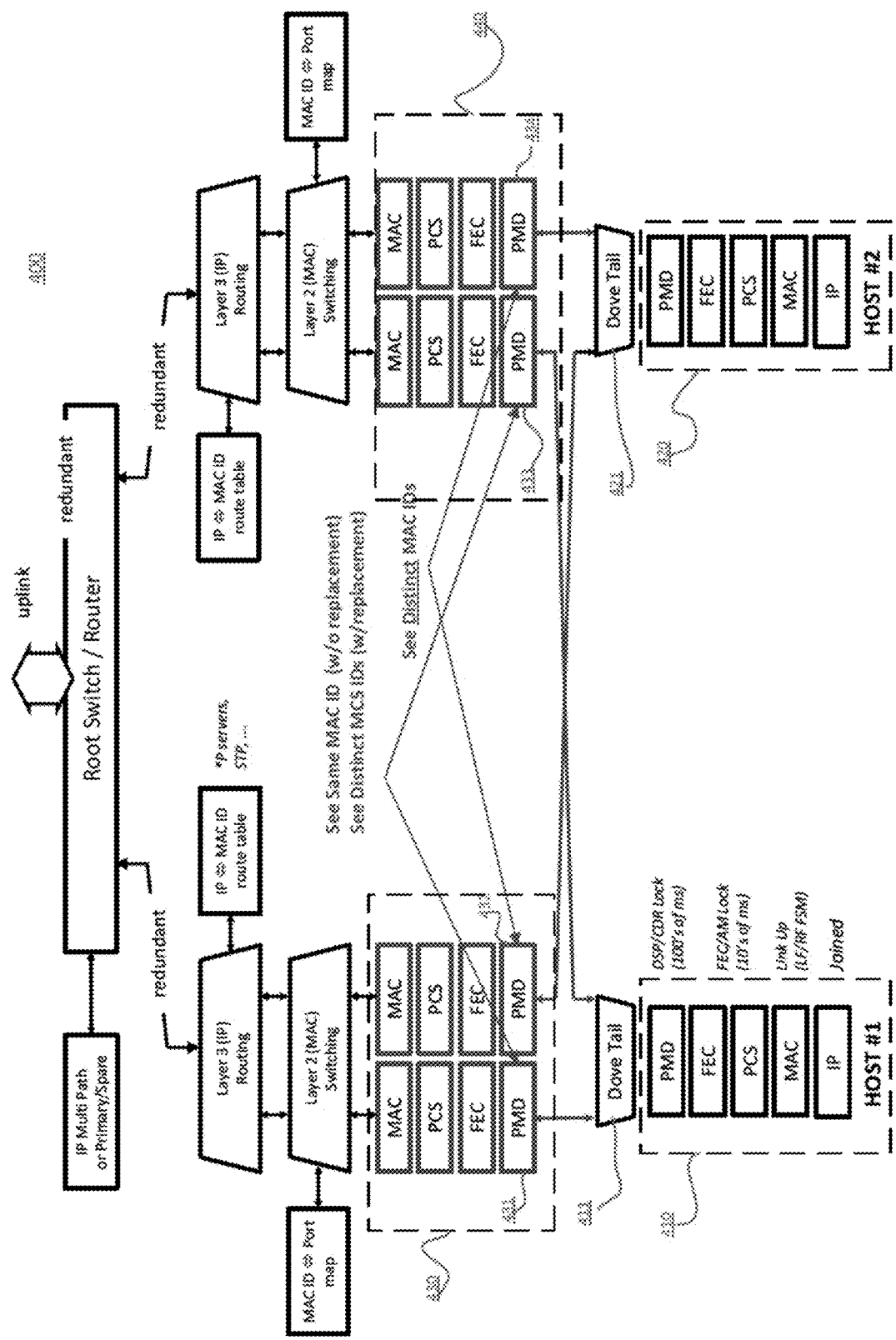
FIG. 4 is a simplified diagram illustrating a communication system 400 according to embodiments of the present invention.

FIG. 4 is a simplified diagram illustrating a communication system 400 according to embodiments of the present invention. This diagram is merely an example, which should not unduly limit the scope of the claims. One of ordinary skill in the art would recognize many variations, alternatives, and modifications. Communication system 400 are shown with two hosts 410 and 420 for illustrative purpose. But for the purpose of describing switching data path, the text focuses on host 410, which can be configured with two data paths and two MAC IDs, depending the mode of operation. The first data path and the second data path are configured as redundant data path, and each includes its own components. As illustrated earlier, the redundancy configuration includes a mechanism for selecting the correct clock signal corresponding to the respective data path. Additionally, since the host for each data path has its own media access control (MAC) ID, for redundant data paths to be viewed and used as a single data path in operation, a mechanism for manipulating the MAC ID for operating host is needed. That is, switching from one data path to another (e.g., due to link failure or other problems) involves the host to assume the MAC ID along the newly selected data path. Each of the data paths in FIG. 4 includes a connection between a host and a switch. For example, host 410 is connected to switch 430 via a network connector that includes dovetail module 411; host 420 is connected to switch 440 via a network connector that includes dovetail module 421. In various embodiments, network connector 250 illustrated in FIG. 2B are used to provide connections between hosts and switches.

Dovetail modules 411 and 421, which are respectively configured as parts of the host 410 and host 421, include logic units for transforming MAC IDs of their hosts. From the switch side, there are two sets of physical medium dependent (PMD) sublayers for each data path, and when they interface with hosts 410 and 420 through dovetail modules 411 and 412, they see different MAC IDs depending on the configuration (e.g., each host may have two distinct MAC IDs provided by the corresponding dovetail module). For example, PMD 431 and PMD 433 both interface with dovetail module 411. As indicated in FIG. 4, a distinct MAC ID is used for communication along each data path. During the data path switching process, each data path use the same MAC IDs they have used before.

As an example, host 410 would show up on ToR #1 (not shown) with MAC ID 0xAAAA, and show up on ToR #2

(also not shown) with MAC ID 0xBBBB. Host 420 is independent of host 410, and host 420 would should up with MAC ID 0xCCCC and 0xDDDD respectively at ToR #1 and ToR #2. The MAC ID transformation process is setup from the beginning. There is no change in the MAC ID transformation mechanism before/after the switch over. Before the switch over, ToR #2 thinks that host 410 has MAC ID 0xBBBB (but host 410 is sending IDLEs to ToR #2). This does not change after the switch over, except that ToR #2 starts seeing traffic from host 410 now.

Without the MAC ID transformation function provided by the dovetail modules 411 and 421, the stack in blocks 432 and 433 would have seen the same MAC ID. This may be unexpected in a regular point-to-point connected network, since it would appear that the same MAC ID is reachable via two distinct paths. Instead, when dovetail modules transforms the MAC ID on the spare path, it gives the appearance that each of blocks 432 and 433 is connected to a distinct MAC (or NIC), even the cost of redundancy is only one copy of NIC in the host. As such, various existing redundancy mechanisms in the upper layers (which rely on having redundant NICs on the host) can continue to be effective with little to no modifications.

As shown, PMD 433 and PMD 434 both interface with dovetail module 421, and they see distinct MAC IDs. More specifically, dovetail modules replace the source MAC ID of each outgoing ethernet frame with a programmable value. This allows the host MAC to take on two distinct identities (e.g., PMD 432 and PMD 434 distinct IDs when connected to the same host 420 via dovetail module 421), such that each ToR switch thinks it is coupled to a distinct MAC. Each egress path independently has its own MAC ID replacement logic.

It is to be appreciated that the dovetail modules 411 and 421 provide the MAC ID transformation mechanism of MAC IDs for host devices, which may not have such capability (e.g., legacy host systems). For example, without dovetail module 411, a conventional host 410 would need two sets of layer components (PMD, FEC, PCS, and MAC), each sets of the physical layer components having their own MAC IDs. In FIG. 4, Host 410 is configured with only a single set of these physical layer components, and it has distinct MAC IDs generated by dovetail module 411 as shown. Host 410 by itself is not capable of switching data path, but the dovetail module 411 enables host 410 to switch data path (e.g., in a link failure event) manipulating MAC Ids of the data path. For example, host 410 commands dovetail module 511 to connect its traffic with the spare ToR (and to fill the path to the failed ToR with IDLEs). For example, referring to FIG. 3A, the process of switching data path involves MUX 305 and MUX 308 both point to the spare data path (in the LINE to HOST direction).

In an example, example, a host may be coupled to two ToR switches (e.g., ToR #1 and ToR #2) via a dovetail module, and the two ToR switch would see two different MAC IDs coming from the same host, even though the host actually has only one MAC ID. For example, when the host is configured to conduct its normal operations using ToR #1, the spare ToR #2 may be already link-up.

From the perspective of the spare ToR #2, it was already fully "linked up" with the host, who "happens" to only be sending IDLEs to the ToR #2. Then, when the fail over happens, the ToR #2 merely starts seeing frames coming from the host, there is no need to re-link-up, no need to reestablish any upper layer handshakes. From the perspective of the spare ToR #2, it was already fully "linked up" with the host, which "happens" to only be sending IDLEs to the ToR #2. Then, when the failover happens, the ToR #2 merely starts seeing frames coming from the host, and there is no need to re-link-up, nor the need to reestablish any upper layer handshakes.

It is to be noted that ingress and egress (from the standpoint of hosts) data transmission involves different manipulation of MAC IDs by the dovetail modules. When a host transmits data (i.e., egress) via a dovetail module, the host MAC ID is replaced by a different MAC ID configured by the dovetail module; when the host receives data (i.e., ingress) via the dovetail module, the dovetail module changes the destination MAC ID to the actual host MAC ID so the host can receive the incoming data.

Figure 5:
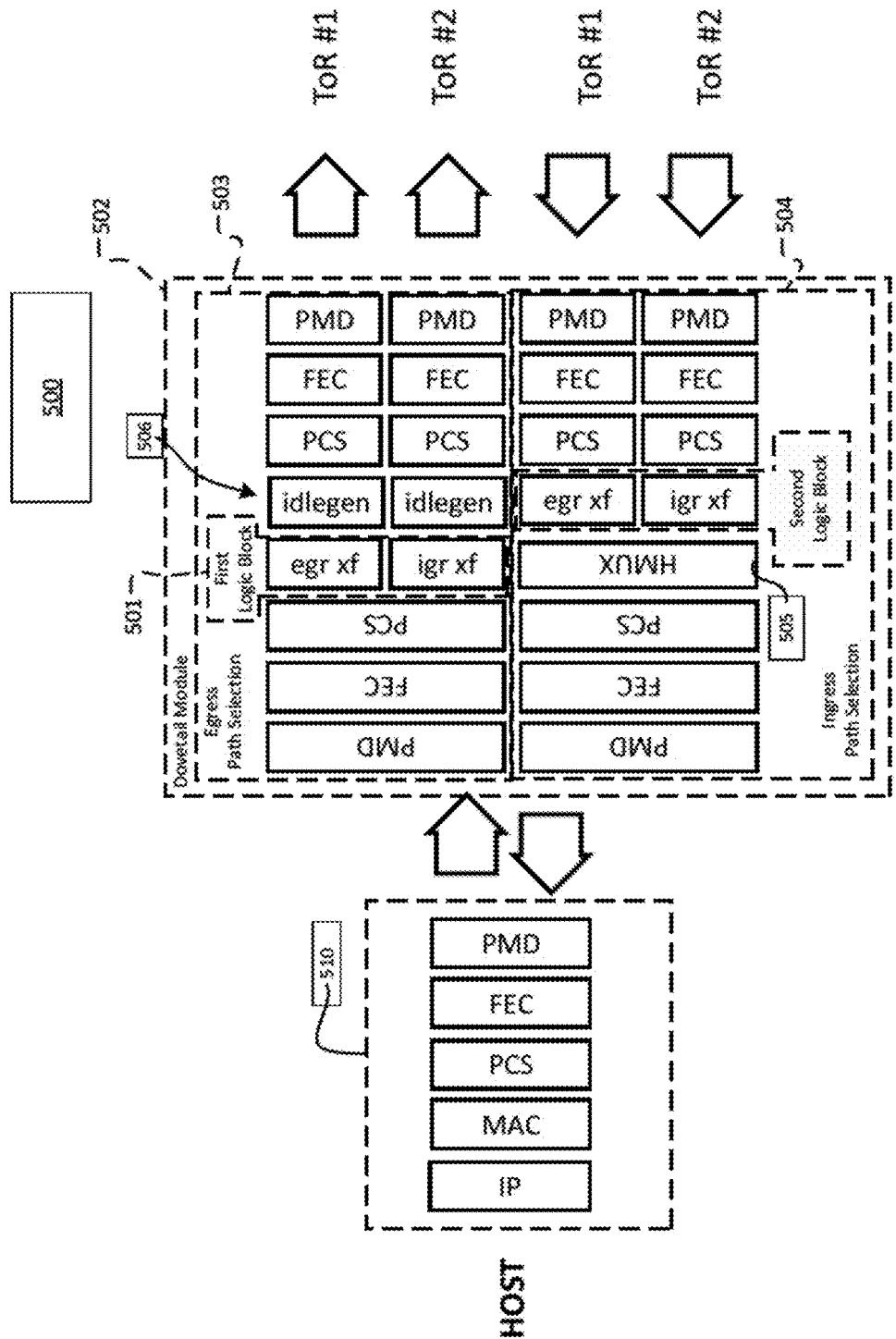
FIG. 5 is a simplified diagram illustrating a host device 500 according to embodiments of the present invention.

FIG. 5 is a simplified diagram illustrating a host device 500 according to embodiments of the present invention. This diagram is merely an example, which should not unduly limit the scope of the claims. One of ordinary skill in the art would recognize many variations, alternatives, and modifications. Host 510 interfaces with dovetail module 502 as shown. Dovetail module 502 includes redundant components (e.g., PMD, FEC, PCS and other blocks) that host 510 lacks, and these redundant components allow host 510 to connect to different data paths (e.g., switching to a data path due to detected data path failure) with distinct MAC IDs. For example, dovetail module 502 can be implemented with communication device 200 or network connector 250.

The communication between host 510 and dovetail module 502 includes both egress path section 503 and ingress path section 504 (e.g., both egress and ingress defined from the perspective of host 510). Egress path section and ingress path section are configured differently, as different processes are performed. Processing egress data from host 510 involves transforming host MAC IDs to different MAC IDs to the data based on the destination; processing ingress data to be received by host 501 involves transforming different MAC IDs to the host MAC ID. Egress path section 503 includes logic block 501, as shown, which include both ingress lock "igr xf" and egress logic "egr xf" for transforming MAC IDs for host 510. Egress path section 503 additional includes IDLE generator blocks (e.g., "idlegen 506").

The ingress path section 504—a part of the ingress data path—includes logic block 507. Logic block 507 includes ingress lock "igr xf" and egress logic "egr xf" for transforming MAC IDs for host 510. The ingress path section 504 also includes HMUX block 505. The HMUX block 505 is quasi-statistically selectable, and a part of the ingress data path.

It is to be noted that while there is only a single host 510, which has a single egress data path and a single ingress data path, dovetail module 502 includes two sets of egress data paths and two sets of ingress data paths, which are associated with different MAC IDs, depending on the implementation and operation mode.

The dovetail module 502 may include a "white list", which specifies which ethernet frames to forward from the host 510 to ToR switches. For example, for the HOST to LINE direction, the "white list" mechanism ensures that each ToR sees only the frames meant for that path. As explained above, logic blocks are configured to transform MAC IDs for host 510. In various embodiments, logic units inspect the destination MAC ID of each ethernet frame going through its path, and discards frames that are destined for a MAC ID which is not specified on its white list. For example, each egress path has its own independent white list, which enables the host 510 to control which frames are to be seen by which ToR switches. Section 501 comprises source MAC ID transformation logics that transforms source MAC ID of each outgoing ethernet frame with a programmable value. This allows the host 510 MAC to take on two distinct identities (provided by the dovetail module 502), such that each ToR thinks it is coupled to distinct MACs, depending on the operation mode. Each egress path independently has its own MAC ID transformation logic. Thus, while host 510 only has a single set of components and a single MAC ID, it can still operate with two data paths with two MAC IDs afforded by the dovetail module 502. It is to be appreciated that operation of dovetail module 502 minimizes of the impact of switching data paths (e.g., in a link failure event) to a communication system, as the MAC IDs manipulation and data path switching are configured to be "invisible" to upper layer protocols.

The ingress data path involves different transformation of MAC IDs. When a ToR sends frames back to the host 510, the ToR would use the transformed (i.e., perform by dovetail module 502 in the process described above) MAC ID as the destination MAC ID in the frame that it sends to host 510. In various implementations, a corresponding reverse-transformation of the destination MAC IDs is implemented on the ingress path so that when the incoming frame reaches host 510, the host MAC properly sees its real mac ID in the destination MAC ID field of the incoming frames.

The switch of data path can be initiated in various scenarios (e.g., failover event, link interruption, link slow down, etc.). As example, Table 1 below processes performed (by communication devices described above) upon a failover event:

TABLE 1

| # | Disruption | Implication | Solution | Mechanism |
|---|---|---|---|---|
| 1 | When the current ToR fails, its LRX clock becomes unusable and the HTX has to track a different LRX clock. | HTX FIFO crash, host receiver sees a sudden PPM, may lose lock | Adjust the periodic packet management (PPM) slowly, slap HTX FIFO; run HTX with local lock | External PLL or FLL; PPM eFIFO |
| 2 | Host receiver sees FEC error burst, PCS link down upon switching | LF percolates to upper layers | HMUX sends IDLE during transient failure | HMUX with PPM eFIFO |
| 3 | ToR #1 and ToR #2 see the same MAC ID | MAC IDs are supposed to be globally unique; need to consider if/how duplicate MAC ID can confuse upper layer protocols. | Use a different MAC IDs for connecting to two ToRs. | MAC IDs replacement within the dovetail module. |
| 4 | Unless the secondary path is kept fully-joined, the switch-over is effectively be treated as a "plug-in" events. | Need to consider impact on switch-over time. (e.g., ToR may need to trigger discovery protocols to refresh routing/mapping tables) | Bring up the secondary to fully-joined state; keep it alive by keeping PCS link up. | Quasi-statically selectable LRX to HTX MUX to enable host to perform initial handshake protocols sequentially with both ToRs, to get to JOINED state; DST-MAC ID-based frame filtering in HRX to LTX to enable host to send periodic PING to secondary ToR to keep alive, if needed |

It is to be appreciated that the processes outlined in Table 1 can be modified in various ways, depending on the implementation.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A protection switching device comprising:
   a first connector configured to connect a first host device to the protection switching device, the protection switching device being separate from the first host device;
   a second connector configured to connect the protection switching device over a first link to a first switch among a plurality of switches coupled to a second host device;
   a third connector configured to connect the protection switching device over a second link to a second switch among the plurality of switches coupled to the second host device; and
   protection switching circuitry configured to selectively connect the first host device to the first link to establish a communications connection to transfer a first portion of data between the first host device and the second host device via the first switch, to selectively modify content of a second portion of the data to enable transfer of the second portion of the data using the second link, to selectively connect the first host device to the second link to maintain the communications connection, and, based on the modified content, to transfer the second portion of the data between the first host device and the second host device via the second switch.

2. The protective switching device of claim 1, wherein the protection switching circuitry is configured to enable switching from the first link to the second link to transfer the second portion of the data by changing control information of the second portion of the data to be associated with the second switch instead of being associated with the first switch.

3. The protection switching device of claim 1, wherein the protection switching circuitry is configured to:

during transfer of the first portion of the data using the first switch and the first link, perform a conversion between a host medium access control address of a network interface card of the first host device and a first medium access control address allocated to the first host device for transfer of the first portion of the data using the first link and the first switch; and during transfer of the second portion of the data using the second switch and the second link, perform a conversion between the host medium access control address of the network interface card and a second medium access control address allocated to the first host device for transfer of the second portion of the data using the second link and the second switch.

4. The protection switching device of claim 1, wherein the protection switching circuitry is configured to receive a signal from the first host device indicative of a failure on the first link, and in response to the signal, selectively connect the first host device to the second link to maintain the communications connection.

5. The protection switching device of claim 1, wherein the protection switching circuitry is configured to, when switching from the first link to the second link, at least one of a) prevent transfer of an idle signal to the second switch, and b) transfer an idle signal to the first switch.

6. The protection switching device of claim 1, wherein the first connector comprises the protection switching circuitry.

7. The protection switching device of claim 6, wherein the protection switching circuitry comprises:
a switching device; and
a control circuit separate from the switching device and configured, based on control information of the data, to control a state of the switching device to select the first link or the second link.

8. The protection switching device of claim 6, wherein the protection switching circuitry comprises:
a first multiplexer connected to the first link;
a second multiplexer connected to the second link; and
a control circuit configured to control states of the first multiplexer and the second multiplexer to select the first link or the second link.

9. The protection switching device of claim 1, wherein the protection switching circuitry is configured to selectively connect a network interface card of the first host device to the first link to establish the communications connection between the network interface card and the second host device, and to selectively connect the network interface card to the second link to maintain the communications connection.

10. The protection switching device of claim 1, wherein the protection switching circuitry is configured to:
synchronize an output of the third connector with a first clock signal of the first link when the first portion of the data is transferred via the first link to the first host device; and
synchronize the output of the third connector with a second clock signal of the second link when the second portion of the data is transferred via the second link to the first host device.

11. The protection switching device of claim 10, wherein the protection switching circuitry is configured to buffer the first portion of the data when received, and to transfer the buffered first portion of the data to the output of the third connector when switching from transferring the first portion of the data via the first link to transferring the second portion of the data via the second link.

12. The protection switching device of claim 1, wherein the protection switching circuitry is configured to:
synchronize a frequency of a signal output from the third connector with a first frequency of a first signal received via the first link when the first portion of the data is transferred via the first link to the first host device, the first signal comprising the first portion of the data; and
synchronize the frequency of the signal output from the third connector with a second frequency of a second signal received via the second link when the second portion of the data is transferred via the second link to the first host device, the second signal comprising the second portion of the data.

13. The protection switching device of claim 12, wherein the protection switching circuitry comprises:
a first buffer configured to buffer the first portion of the data;
a second buffer configured to buffer the second portion of the data; and
a phase lock loop circuitry configured to control transfer timing of the first portion of the data from the first buffer to an output of the third connector, and to control transfer timing of the second portion of the data from the second buffer to the output of the third connector.

14. The protection switching device of claim 13, wherein the phase lock loop circuitry is configured to determine the first frequency and the second frequency, to control the transfer timing of the first portion of the data to synchronize the frequency of the signal output from the third connector with the first frequency when the first portion of the data is output from the third connector, and to control the transfer timing of the second portion of the data to synchronize the frequency of the signal output from the third connector with the second frequency when the second portion of the data is output from the third connector.

15. The protection switching device of claim 1, wherein the protection switching circuitry is configured to transfer to the first host device the first portion of the data received via the first switch from the second host device, to synchronize an output frequency of the first portion of the data from the third connector to the first host device with a reception frequency at which the first portion of the data is received from the first link, subsequent to connecting the first host device to the second link, to transfer to the first host device the second portion of the data received via the second switch from the second host device, and to synchronize an output frequency of second portion of the data from the third connector to the first host device with a reception frequency at which the second portion of the data is received from the second link.

16. The protection switching device of claim 15, wherein the protection switching circuitry is configured to modify content of the second portion of the data to enable transfer of the second portion of the data using the second link, and, based on the modified content, to transfer the second portion of the data between the first host device and the second host device via the second switch.

17. The protection switching device of claim 15, wherein the third connector is configured to receive a signal from the first host device indicative of a failure on the first link, and in response to the signal, to switch from the first link to the second link.

18. The protection switching device of claim 15, wherein the third connector is configured to:
during transfer of the first portion of the data using the first switch and the first link, perform a conversion between a host medium access control address of a network interface card of the first host device and a first medium access control address allocated to the first host device for transfer of the first portion of the data using the first link and the first switch; and during transfer of the second portion of the data using the second switch and the second link, perform a conversion between the host medium access control address of the network interface card and a second medium access control address allocated to the first host device for transfer of the second portion of the data using the second link and the second switch.

19. The protection switching device of claim 15, wherein the third connector comprises the protection switching circuitry.

20. The protection switching device of claim 15, wherein the protection switching circuitry is configured to selectively connect a network interface card of the first host device to the first link to establish the communications connection between the network interface card and the second host device, and to selectively connect the network interface card to the second link to maintain the communications connection.

\* \* \* \* \*